Feb. 12, 1929. 1,702,207
J. GEDDES
MEANS FOR THE HYDRAULIC TRANSMISSION OF POWER OR FOR USE AS BRAKES
Filed Jan. 13, 1927  2 Sheets-Sheet 1
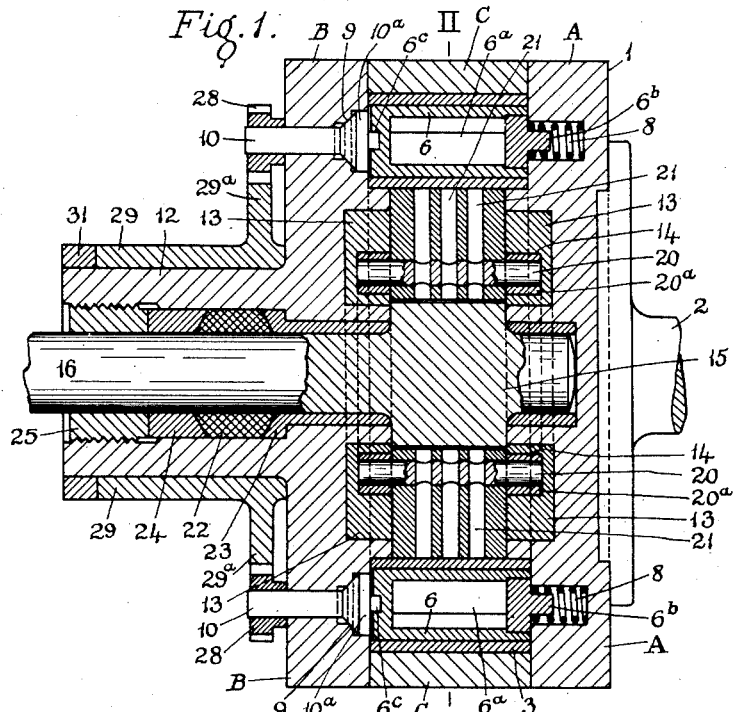
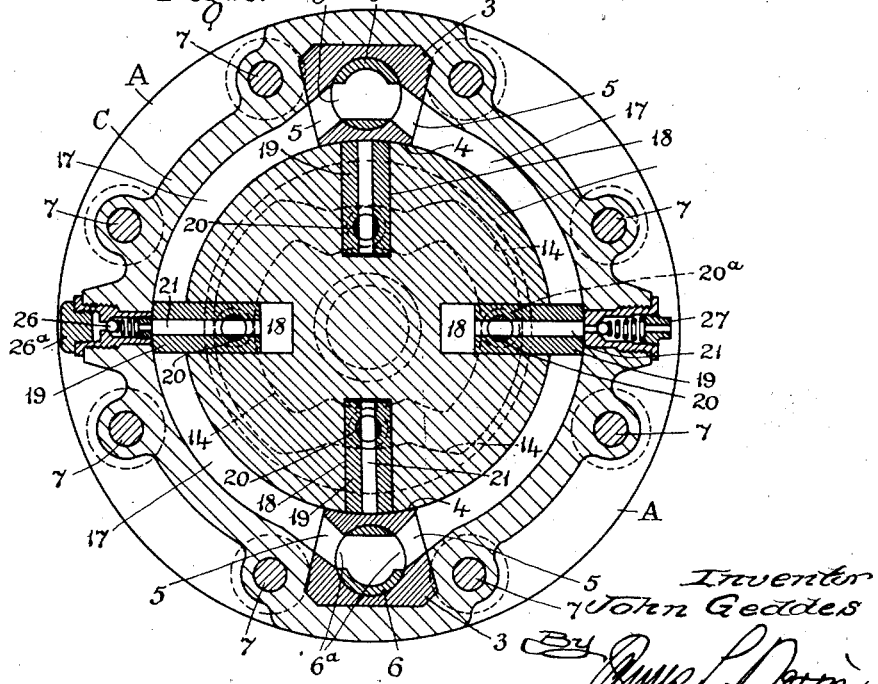
Inventor
John Geddes
Attorney Feb. 12, 1929.

J. GEDDES 1,702,207

MEANS FOR THE HYDRAULIC TRANSMISSION OF POWER OR FOR USE AS BRAKES

Filed Jan. 13, 1927    2 Sheets-Sheet 2

Inventor
John Geddes
By
Attorney

Patented Feb. 12, 1929.

1,702,207

UNITED STATES PATENT OFFICE.

JOHN GEDDES, OF MIDDLESEX, ENGLAND.

MEANS FOR THE HYDRAULIC TRANSMISSION OF POWER OR FOR USE AS BRAKES.

Application filed January 13, 1927, Serial No. 160,974, and in Great Britain March 9, 1926.

This invention relates to hydraulic mechanism for transmitting power from one unit to another unit, or for use as a brake, and is principally adapted for transmitting power from a driving unit or member to a driven unit or member, where it is necessary for the speed of the driven unit to be regulated or varied from the maximum speed of the driving unit to any intermediate speed or to a standstill whilst the driving unit can be kept running at a constant speed.

The object of the present invention is to so construct such an apparatus that it is simple and cheap to manufacture, easily assembled, efficient in use and wherein leakage of the liquid is reduced to a minimum.

The invention contemplates improvement in the construction of the apparatus; an improved method of mounting the valves; an improved means for operating the valves and means for applying a brake to the driven member when the valves are fully opened, as will be hereinafter described and claimed.

My invention will be clearly understood from the following description aided by the annexed drawings in which:—

Figure 1 is a sectional elevation of an apparatus constructed according to the invention, and Figure 2 a section on the line II—II of Figure 1.

Figure 3:
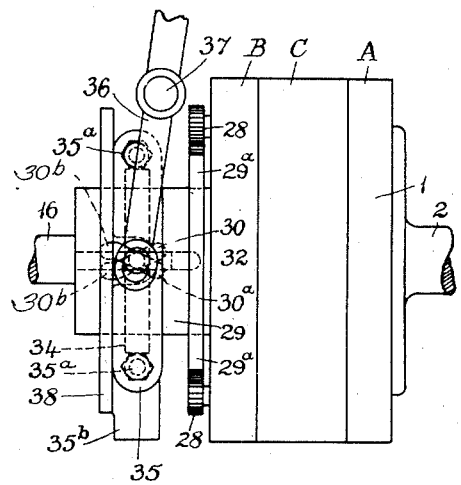
Figure 3 is a side view, on a smaller scale, of the apparatus and showing the method of operating the valves.

In the apparatus shown on the drawing the driving member 1 consisting of an outer, preferably circular, casing is connected or connectible to the prime-mover or driving shaft 2, and such member is provided on its inner side with two projecting portions 3, 3, each of which is bored longitudinally. The faces of the projecting portions 3 which are directed toward the axis of rotation of the driving member 1 are curved as at 4 and each of said portions 3 has lateral ports 5 communicating with its longitudinal bore. A valve 6 is rotatable in each of the longitudinal bores of the projecting portions 3 for a purpose to be hereinafter set forth.

According to one embodiment of this invention the member 1 consists of two outside parts A, B and a distance ring or piece C between said parts, secured together by bolts 7 and nuts, and in such ring C are formed two suitably shaped substantially diametrically located recesses in which are positioned the two valved blocks or projecting pieces 3, 3.

The valves 6, which are rotatable in the longitudinal bores of the parts 3, each consists of a tubular member closed at one end and having diametrically located ports $6^a$. The open end of each valve 6 is closed by a loose plug $6^b$ having a stem positioned in a hole or recess in the part A. Coiled springs 8 mounted on the stems of the plugs $6^b$ between the plugs $6^b$ and the bottoms of the recesses in the part A tend to press the plug $6^b$ and valves 6 away from the part A. On the outer end of the closed end of each valve 6 I form a slot $6^c$.

A pair of holes are formed through the part B. Each of said holes has its diameter enlarged at the end thereof which is directed toward the part C and has a conical valve seating 9 at said end. A rod 10 extends through each of the holes in the part B, and each of said rods has a portion $10^a$ of larger diameter than the rod to seat in the enlarged portion of said holes and a coned portion which bears against the seating 9. On the end of said enlarged portion $10^a$ is a block or projection which engages in the slot $6^c$ in the valve 6, and which, when the rod 10 is rotated, will rotate the valve 6.

The springs 8 normally tend to force the valves 6 and rods 10 away from the part A and to press the cone portions of the rods 10 against the valve seatings 9 and so form a fluid tight joint, or other spring means may be employed for pressing the valve 6 on to the valve seating 9.

The part B has a tubular portion 12 extending from its outer side.

Circular recesses are formed in the inner faces of the parts A and B in which are secured rings 13, 13 in which are formed cam tracks 14, 14 or such cam tracks 14, 14 could be formed directly in the parts A, B.

In the driving member 1 is rotatably mounted the usual inner member 15, which I will call the driven member, which is connected to or connectible to the apparatus or shaft 16 to be driven. Such member is circular and of such a diameter as to have a running fit between the curved inner faces 4, 4 of the projections 3, 3 on the driving member 1, so that an annular space or channel 17 is left between the inner surface of the distance piece or ring C of the driving member 1 and the periphery of the driven member 15 as is known, which space or channel 17 is divided into two sections or chambers by the projections 3, 3 on the driving member.

A number of radial slots 18 are formed in the driven member 15, in each of which slots is a radially movable blade or block 19, each blade 19 being provided with a cross spindle 20, the ends of which project beyond the blades 19 and ride in the cam tracks 14 for projecting the blades 19 into the annular space or channel 17 during the greater part of a revolution of the driving member and withdrawing the blades 19 into the driven member 15 as they approach the projections 3, 3 on the driving member 1 so as to clear same as is usual, and the ends of the spindles 20 may be provided with rollers 20$^a$ to ensure easy action.

The blades 19 are preferably hollow or have longitudinal ports 21 through same, so that, when the whole apparatus is full of liquid and when a blade 19 is moved toward the axis of the driven member 15 it will displace liquid in the bottom of its slot 18, which liquid will pass through the longitudinal ports 21 and fill the space previously occupied by the blade 19 in the annular channel 17 and so maintain the same pressure in the channel 17.

The blades 19 are so constructed that, as one is withdrawn from the channel 17 another is projected into the channel to replace the withdrawn blade so as to maintain the same pressure.

When the driving member 1 revolves, supposing the valves 6 to be closed, the projecting portions 3, 3 will drive or carry the liquid in the channel 17 with them, which liquid acting on the blades 19 will cause the driven member 15 to revolve at the same speed. Now if the valves 6 are partially rotated to bring their ports 6$^a$ into register with the ports 5 of the parts 3 a certain amount of the liquid in the channel 17 can pass through the ports 5 and valves 6, so that the projections 3, 3 only force or move a part of the liquid against the blades 19 and consequently the speed of the driven member 15 is reduced in relation to the driving member 1. The valves 6 can be so regulated that the quantity of liquid to be passed through the parts 3 can be regulated from the smallest amount to the full capacity of the channel, which will vary the speed of the driven member 15 in proportion to the speed of the driving member 1 as the amount of liquid passing through the parts 3 is in proportion to the capacity of the channel 17.

The tubular extension 12 of the part B acts as a bearing for the shaft or extension 16 of the driven member 15 and suitable packing 22 is inserted between said extension and member to ensure a fluid tight joint. Such packing 22 may be forced against an anti-friction metal liner 23 by a ring 24 pressed in by a screwed ring plug 25, as will be well understood.

I provide the ring C with a non-return filling valve 26, closed by a screw plug 26$^a$, so that by removing the plug 26$^a$ and substituting a pump, liquid can be pumped into the apparatus. The ring C may also be provided with a non-return relief valve 27 which will open against its spring if the pressure of the liquid in the apparatus through any cause should rise too high.

Figure 4:
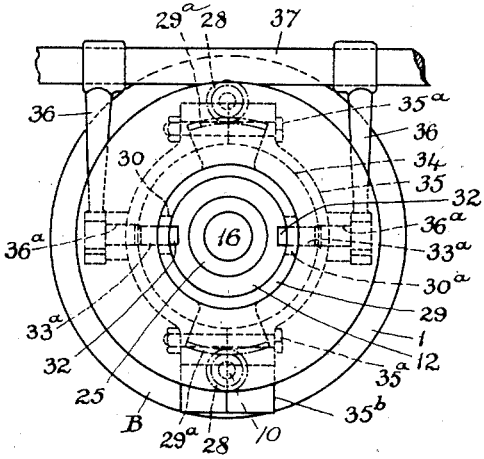
Figure 4 is an end view of same, Figure 5 a plan partly in section.
Figure 6:
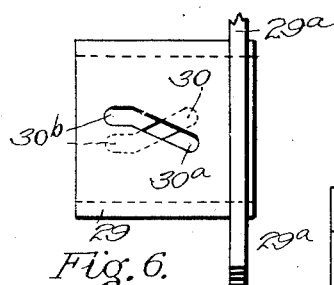
Figure 6 is a side elevation of the sleeve shown in Figures 4 and 5 for actuating the valves.
Figure 5:
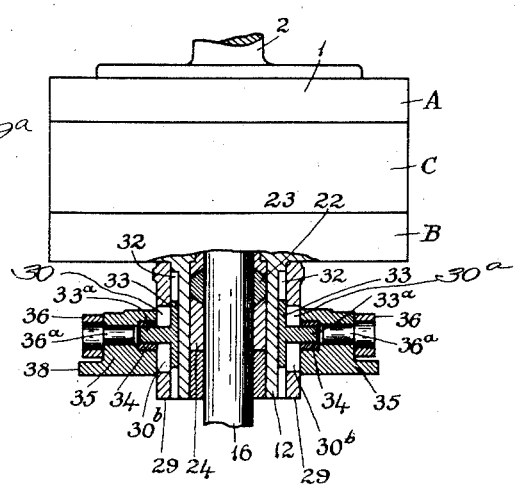

Means for operating the valves 6 are illustrated in Figures 3 to 5. I mount on the outside end of each valve rod 10 a toothed wheel or toothed quadrant 28 and on the tubular extension 12 of the part B of the driving member 1 I rotatably mount a sleeve 29 carrying a pair of diametrically located quadrants or extensions 29$^a$ having teeth which mesh with the teeth on the wheels or quadrants 28 and I form a pair of diametrically arranged slots 30 in the sleeve 29, having portions 30$^b$ extending longitudinally of said sleeve and portions 30$^a$ extending at an angle to such longitudinal portions. The sleeve 29 is held on to the tubular extension by ring 31.

In the periphery of the tubular extension 12 I form a pair of diametrically located grooves or keyways 32, and slidably mount a feather 33 in each of said grooves. These feathers have pins 33$^a$ which project some little distance through the slots 30, in the sleeve 29 and enter two holes or recesses in a ring 34 which is adapted to rotate in a recess in a strap 35.

The strap 35, which may be formed in halves secured together by bolts 35$^a$ and nuts, is non-rotatable but can slide lengthways on the sleeve 29 and is operated by two arms 36 secured to a rockshaft 37 mounted on suitable supports. The lower ends of the arms 36 are provided with pins 36$^a$ which engage in holes or recesses in the strap 35. The shaft 37 is rocked by any suitable means, such as a lever secured thereto or an arm connected to a foot pedal, or instead of two arms 36, a yoke could of course be employed. The strap 35 may be formed with extensions 35$^b$ which ride in guides to hold the straps 35 from revolving.

In operation and supposing the valves 6, 6 to be half way closed, and supposing the driving member 1 to be revolving driven from the prime-mover, the blocks 3, 3 will force forward a certain amount of liquid in the channel 17, which liquid, pressing on the blades 19 will drive same forward, but as the valves 6, 6 are half way open a certain amount of liquid in the channels 17 will pass or escape through the ports 5 and valve openings 6$^a$ to the rear sides of the blocks 3, 3 and consequently the pressure exerted by the blocks 3, 3 through the liquid on the blades 19 will be reduced and the driven member 15 will revolve at a less speed than the driving member 1.

During the greater part of a revolution of the driven member 15 the blades 19 will be fully projected by the movement of the ends of spindles 20 in the cam tracks 14 into the channel 17 (as will be seen on the right and left hand of Figure 2) but the cam tracks 14 are so shaped that, just as a blade 19 reaches a block 3 the blade 19 will be withdrawn fully into the member 15, so that the blade 19 clears the block 3 (as will be seen at the top and bottom of Figure 2).

With the driving member 1 will also revolve the sleeve 29, quadrants 29ª, feathers 33, pins 33ª and rings 34, but the strap 35 and brake member 38 will not revolve, the ring 34 running in the recess in the strap 35. As the member 1 carrying the shaft and toothed wheels 28 revolves with the quadrants 29ª no relative movement will take place between the quadrants 29ª and toothed wheels 28, so the valves will remain in the placed position.

Now if it is desired to increase the speed of the driven member 15, say to its full limit, the shaft 37 is rocked, and with it the arms 36 which, through the pins 36ª, will slide the strap 35 towards the member 1, and the strap 35 will carry with it the ring 34, which will in turn carry with it the pins 33ª and feathers 33. The feathers 33 will slide in the grooves 32 which cause the feathers 33 to move parallel to the axis of the shaft 16 and, since the pins 33ª will also move in a straight axial line they will, through their movement in the angular portions 30ª of the slots 30 in the sleeve 29, partially rotate the sleeve 29 on the tubular extension 12. This movement of the sleeve 29 will, through the corresponding movement of the quadrants 29ª and the engagement of the latter with the toothed wheels 28, rotate the valve rods 10 and close the valves 6, 6 and when such valves 6, 6 are closed, no liquid from the channel 17 can pass through same, so that the full force of the blocks 3, 3 is exerted on the liquid and the blades 19 and the driven member will revolve at the same speed as the driving member.

If on the other hand it is desired to reduce the speed of the driven member to a standstill, then the shaft 37 and arms 36 are rocked in the opposite direction away from the member 1 when the feathers 33 will be moved along the grooves 32 in the opposite direction and the pins 33ª will reverse the movement of the sleeve 29 and quadrants 29ª and revolve the rods 10 and valves 6 to open the valves. By the time the sleeve 29 has been rotated far enough for the pins 33ª to reach the ends of the angular parts of the slots 30, the valves 6, 6 will be fully open and, since the ports 5, 5 in the blocks 3, 3 are of the same area as the channel 17, all the liquid will pass through same and no pressure will be exerted on the liquid or blades 19, so that no power will be transmitted through the liquid from the driving member 1 to the driven member 15.

A continued movement of the shaft 37 and arms 36 will move the feathers 33 to the outer ends of the grooves 32 and the pins 33ª will move into the longitudinal parts 30ᵇ of the slots 30, but, as these longitudinal parts 30ᵇ are in line with the axis of the shaft 16, the pins 33ª will simply slide along same and not revolve the sleeve 29. By the time the pins 33ª have reached the ends of the longitudinal parts 30ᵇ of the slots 30 the brake member or disc 38 will have engaged with the member or disc fixed on the shaft 16 and so hold the shaft 16 against rotation.

It will be understood that the drive could be reversed, that is to say, the member 15 could be the driving member and the member 1 the driven member, in which case the blades 19 would force the liquid towards the blocks 3, 3.

For use as a brake the outer member 1 would be held and by partially or wholly closing the valves 6, 6 the rotation of the inner member would be retarded or stopped or vice-versa.

What I do claim as my invention and desire to obtain by Letters Patent is:—

1. A hydraulic transmission including a casing composed of two heads and an annulus, two diametrically disposed abutments carried by and of the same width as the annulus and projecting beyond the internal face thereof, each abutment being provided with a transverse port, a rotary valve bisecting said port and provided with a port for controlling said transverse first port, said valve being substantially as long as the width of the abutment, a rotor mounted between the heads and forming with the annulus an annular liquid containing channel, the inner ends of the abutments contacting the periphery of the rotor, said rotor being provided with a plurality of radial pockets open to the channel, a blade slidably mounted in each pocket, cooperating means carried by the blades and the heads for moving said blades into and out of said channel as the blades pass the abutments, and means for actuating the valves to control the flow of liquid through the ports.

2. A hydraulic transmission, including a casing composed of two heads and an annulus, two diametrically disposed abutments carried by and of the same width as the annulus and projecting beyond the internal face thereof, each abutment being provided with a cylindrical bore and a pair of ports at a right angle to said bore, a cylindrical valve rotatable in the cylindrical bore of each abutment, each of said valves having one end closed and a pair of ports in the walls thereof, adapted to be brought into registry with the ports of its associated abutment, said valves being substantially as long as said bores, a plug sealing the free end of each valve, a spring mounted in one head and exerting a pressure against the plug to seat the valve, a rod rotatably mounted in the other head adjacent the closed end of the valve and against which the valve rests, cooperating means connecting the rod and valve together for unitary movement, means for rotating the rods and valves to control the ports of the abutments, a rotor concentrically of the annulus and in contact with the inner ends of the abutments, said rotor being spaced from said annulus and forming with this later a liquid containing space, blades carried by the rotor, and co-operating means carried by the blades and heads for retracting and projecting the blades into and out of the annular space.

In testimony whereof I have hereunto set my hand.

JOHN GEDDES.